United States Patent Office
3,616,651
Patented Nov. 2, 1971

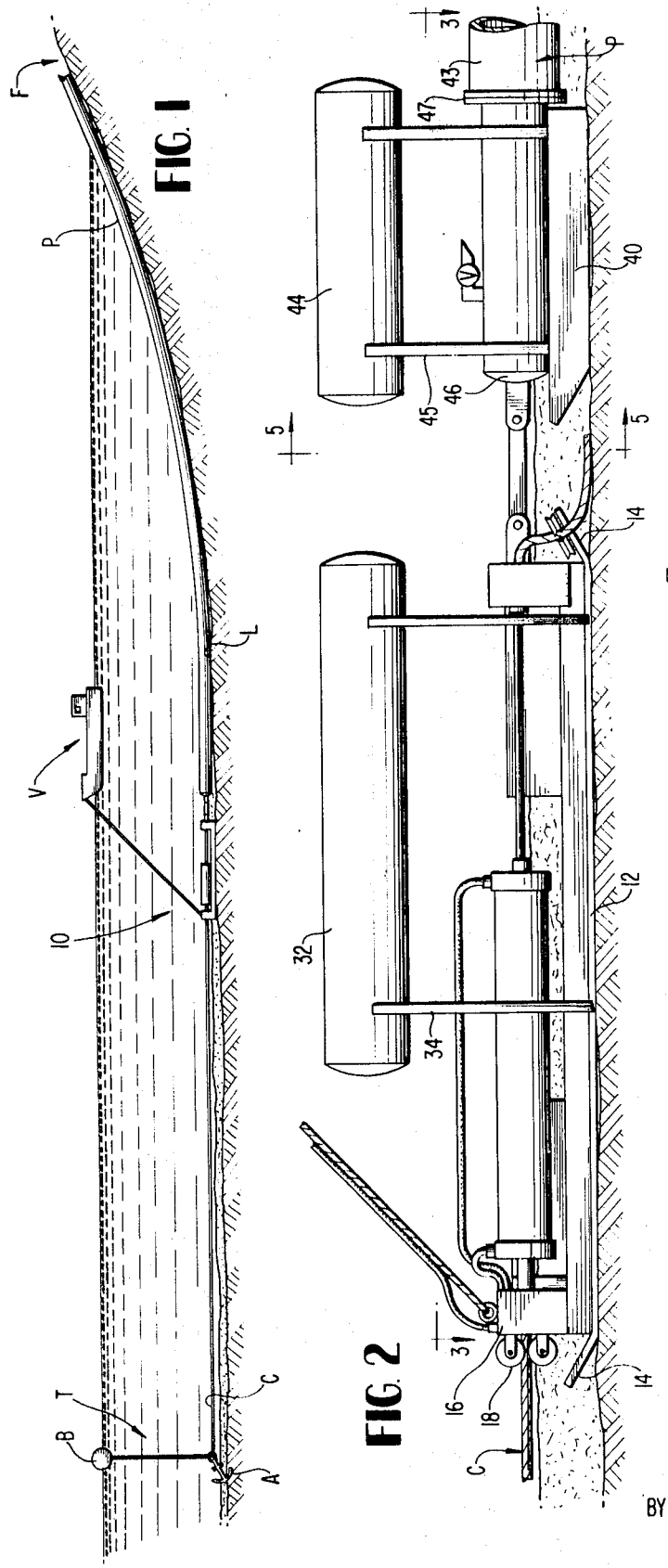

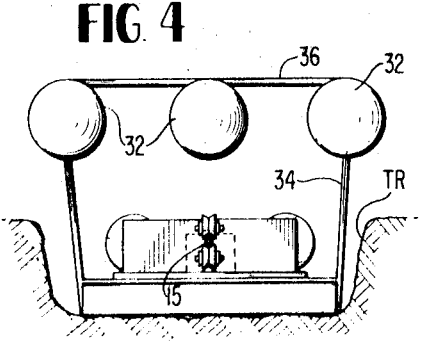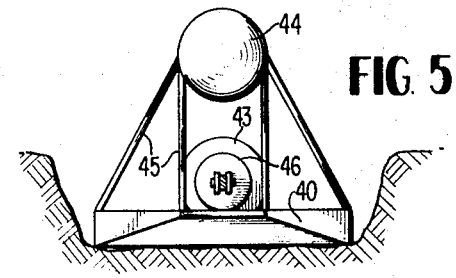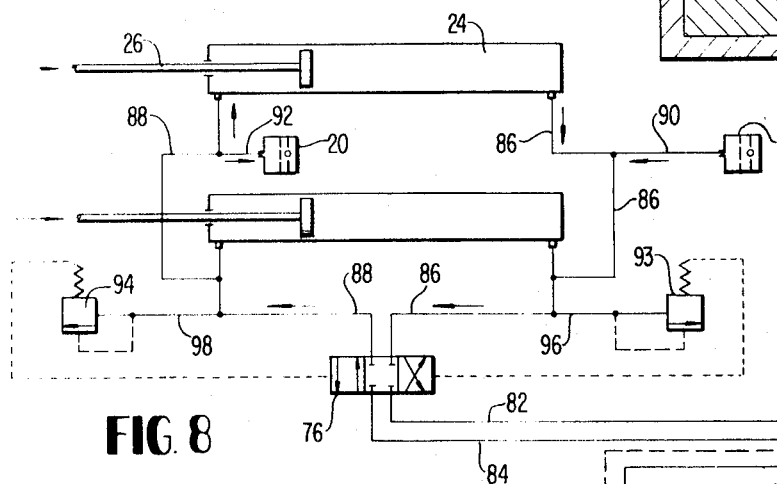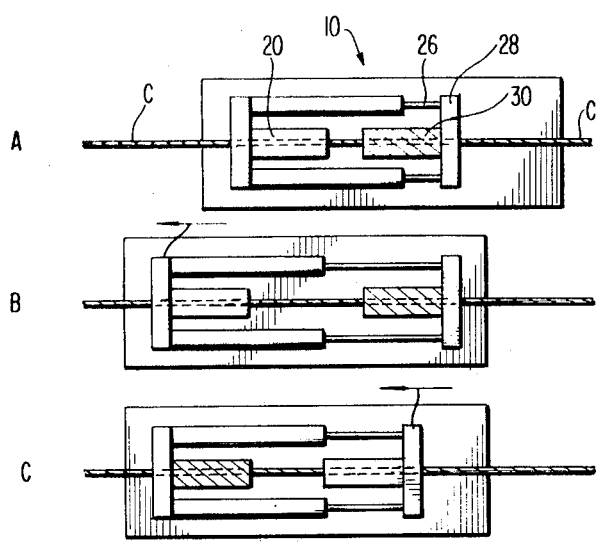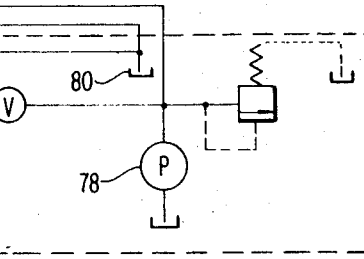

3,616,651
APPARATUS AND METHODS FOR LAYING
UNDERWATER PIPELINES
N. Ming Chang, San Francisco, and Harold V. Anderson,
Novato, Calif., assignors to Santa Fe International Corporation
Filed Sept. 24, 1969, Ser. No. 860,643
Int. Cl. F16l 1/00; B25j 5/02
U.S. Cl. 61—72.3
12 Claims

ABSTRACT OF THE DISCLOSURE

A cable extends from the shore in a prepared trench on the sea bottom out to an offshore site and is there anchored. A pipe pulling assembly, including a pair of fluid actuated cable grippers and a pair of hydraulic cylinders, is coupled to the cable adjacent the shore. The seaward end of the pipeline is connected to the pipe pulling assembly. The pipe pulling assembly and pipeline are carried on sleds having flotation devices. The grippers are alternately actuated to grip the cable. The cylinders are actuated to successively advance the lead gripper along the cable in the seaward direction away from the following gripper which is clamped to the cable and then to advance the released following gripper along the cable in the seaward direction toward the lead gripper which is clamped to the cable in the advanced position thereby pulling the pipeline behind the pipe pulling assembly.

---

The present invention relates to apparatus and methods for laying pipe, cable and the like in an underwater environment and particularly relates to apparatus and methods for laying pipeline for petroleum products between offshore oil production sites or offshore oil receiving or loading terminals and an offshore petroleum facility.

Increased attention has recently been directed to apparatus for and methods of transferring petroleum products, for example, oil, between offshore and onshore terminals. For example, it is known to lay underwater pipeline between offsore and onshore terminals for the transfer of oil in either direction therebetween. Accordingly, oil tankers anchored adjacent the offshore terminal and in oil communication therewith may either receive oil from or transfer oil to the onshore facility via the underwater pipeline and offshore terminal. Further, in the instance of offshore oil production facilities, it is customary, where the water depth and distance between the offshore and onshore facilities permit, to lay pipeline along the sea bottom between the underwater well head and the onshore oil receiving facility. The latter may comprise solely a storage facility for subsequnt transshipment of the oil overland or additional underwater pipeline may be provided between the onshore storage facility and an onshore terminal to an oil tanker anchored adjacent the offshore terminal. With increasing emphasis an offshore oil production and the fact that such production sites are often located in areas remote from oil refining facilities coupled with the increasing use of offshore terminals for transfer of oil in either direction between offshore and onshore terminals, there has arisen the need for truly efficient and effective apparatus and methods for laying underwater pipelines between such terminals.

Such underwater pipelines have heretofore been laid between offshore oil production sites and onshore facilities as well as between offshore and onshore oil transfer terminals. To facilitate description, the term "offshore terminal" is used generally to define, among other things, an offshore oil production site of an offshore oil transfer facility either for transferring oil to the onshore facility via the underwater pipeline or transferring oil received from the onshore facility via the underwater pipeline to an oil tanker anchored adjacent thereto. The term "onshore termnal" is used to define the oil receiving or transfer facility onshore. To lay underwater pipeline, it has, in the past, been customary to either lay a string of pipe from a vessel traversing between onshore and offshore terminals or to pull a string or pipe utilizing a winch on a vessel anchored offshore. Various types of vessels and companion apparatus have been developed to accomplish this. These pipe-laying vessels or barges are, however, subject to varying sea conditions which tend to make the pipe laying quite difficult and hazardous. As will be appreciated, pipe sections are usually connected one to the other onboard pipe laying vessels and are strung out behind the vessels in what may be termed a generally S-shaped or catenary configuration. When it is considered that the pipeline is often formed or steel with a concrete outer coating or other rigid material, it will be readily appreciated that the disposition of the pipeline in the S-shaped or catenary configuration often causes the pipeline to break or become distorted such that the pipeline is no longer a sealed unit. Moreover, the laying of pipeline from such surface floating vessels is highly dependent upon existing sea conditions as the heave, pitch and roll motions of the vessel tend to stress and may often break the pipeline as it is being laid along the sea bottom. Additionally, for laying pipeline in relatively deep water from such surface floating vessels, the length of the unsupported pipeline as it is paid out from the barge increases, causing the pipeline to sag under its own weight. Thus, the bending stresses imposed on the pipeline may exceed allowable limits and result in permanent deformation or rupture.

The present invention provides methods and apparatus for laying pipeline which minimize the above-discussed and other shortcomings of prior pipe laying apparatus and methods and provides various advantages over such prior pipe laying apparatus and methods. The present invention is particularly useful in laying pipeline from an onshore terminal to an offshore terminal. To accomplish the foregoing, the present invention provides a pipe pulling assembly for use with a cable which has previously been laid along an underwater track, preferably an excavated trench, along the sea bottom between the onshore and offshore sites. The cable is fixed to the sea bottom at its offshore end by an anchor and is suitably fixed at its onshore end. The pipe pulling assembly is connected to the onshore end of the cable and the seaward or leading end of the pipeline section is joined to the pipe pulling assembly. The pipe pulling assembly, as well as the pipeline, are mounted on sleds at the onshore site. In use, the pipe pulling assembly advances along the anchored cable drawing the pipeline behind it. As the pulling assembly and the pipeline advance toward the anchored end of the cable, additional pipe sections are attached to the pipeline train until the pulling assembly has drawn the pipeline the full distance between the onshore and offshore terminals. To facilitate dragging the pipeline along the sea bottom, the sleds carry flotation tanks which tend to minimize the friction of resistance to advancement along the sea bottom and counter balance any rotational tendency during pulling. Additionally, the end of the pipe line is closed such that the pipeline per se provides a residual buoyancy and thereby further minimizing the resistance to sliding movement along the sea bottom.

Specifically, the pipe pulling assembly includes a pair of cable grippers connected one to the other by a pair of piston and cylinder arrangements. The cable grippers, as well as the piston and cylinder arrangements, are fluid actuated from a fluid source carried by a surface floating barge or accompanying vessel. To walk the pipe pulling assembly along the cable, the trailing or following gripper is actuated to grip the cable. The leading gripper is then advanced along the cable in a seaward direction away from the following gripper by the extension of the piston and cylinder. Once fully extended, the leading gripper in its advance position, is actuated to grip the cable while the trailing gripper is actuated to release the cable. This piston and cylinder are then actuated to retract and thereby draw the trailing gripper toward the leading gripper, thereby pulling the pipeline train connected to the trailing gripper assembly along the cable. When the trailing gripper reaches an advanced position with the piston and cylinder full retracted, it is actuated to grip the cable. Thereafter, the leading gripper is unclamped or released from the cable. This operation is repeated until the pipe pulling assembly reaches the offshore terminal.

It will be appreciated that the foregoing apparatus and method for laying pipe is not subject to sea conditions as the accompanying barge or vessel can operate in very high seas with only the flexible fluid lines connecting the barge or vessel to the pipe pulling assembly. Moreover, the stresses and strains and bending introduced in the pipeline by paying the pipeline out from a surface floating vessel, as in certain prior conventional methods, are completely eliminated as the pipeline is being laid substantially free of such binding. Thus, there is relatively little danger of rupturing, or otherwise damaging the pipeline during the entire pipelaying operation.

Accordingly, it is a primary object of the present invention to provide a novel and improved method and apparatus for laying pipes, cable or the like in an underwater environment.

It is another object of the present invention to provide novel and unique apparatus and method for laying underwater pipelines between onshore and offshore terminals.

It is still another object of the present invention to provide an apparatus and method for laying underwater pipeline which is substantially independent of existing sea conditions.

It is a further object of the present invention to provide a novel and unique method and apparatus for laying underwater pipeline wherein the pipeline is substantially free of bending stresses during the pipe laying operation.

It is a still further object of the present invention to provide novel and unique method and apparatus for laying underwater pipelines between onshore and offshore terminals wherein the pipeline sections can be readily and easily assembled on shore.

These and further objects and advantages of the present invention will become more apparent upon reference to the following specification, claims, and appended drawings, wherein:

FIG. 1 is a diagrammatic view of a pipe laying apparatus constructed in accordance with the present invention and illustrating a pipeline being drawn from an onshore terminal to an offshore terminal;

FIG. 2 is an enlarged side elevational view of the pipe laying apparatus hereof and further illustrating a fragmentary portion of the leading pipeline section;

FIG. 3 is a horizontal cross sectional view thereof taken generally about on line 3—3 in FIG. 2;

FIG. 4 is an end elevational view of the pipe laying apparatus hereof looking from left to right in FIG. 2;

FIG. 5 is an end elevational view of the pipe head carrying sled taken generally about on line 5—5 in FIG. 2;

FIG. 6 is an enlarged cross sectional view of one of the gripper assemblies employed with the pipe laying apparatus hereof and taken generally about on line 5—5 in FIG. 3;

FIG. 7 is a schematic illustration of the pipe laying assembly hereof in sequential stages of operation; and FIG. 8 is a hydraulic schematic diagram illustrating the fluid control circuit for the pipe laying apparatus.

Referring now to the drawings, particularly to FIG. 1, there is illustrated, a pipe laying apparatus generally indicated at 10 for use in drawing a pipeline P from a point or terminal onshore indicated at F or from an onshore facility along the sea bottom L to an offshore terminal T. Pipe laying apparatus 10, as will be appreciated from the ensuing description, draws pipeline P along a pulling line, preferably a cable C, which is secured to the sea bottom L adjacent its seaward end as by an anchor A. A buoy B is suitably secured to anchor A to indicate the offshore terminal or the terminal portion of the pipeline which is ultimately laid. Pipe laying apparatus 10 draws pipe P along the sea bottom preferably in a prepared trench indicated at Tr in FIG. 4, with the only connection between the pipelaying apparatus 10 and a surface floating vessel or barge V comprising flexible hose lines for conveying pressure fluid between vessel V and apparatus 10. It will thus be appreciated that, as apparatus 10 draws pipeline P along the sea bottom toward the offshore terminal, it is not itself subjected to wave action as is the surface floating vessel V. Moreover, it will be seen that the generally S-shaped or catenary curves which pipe sections normally assume if laid from the surface floating vessel are herein entirely eliminated with the pipeline P assuming in accordance with the present invention a generally linear configuration along the sea bottom, or trench excavated to provide a configuration where bending stresses are not excessive.

Referring now to FIGS. 2 and 3 pipe laying apparatus 10 comprises an elongated sled 12 having upwardly turned ends 14 to facilitate movement along the sea bottom and carrying a mounting block 16 at its leading end. Mounting block 16 is centrally bored in an axial direction as at 15 to receive the pulling line, i.e. cable C, and carry a pair of forwardly projecting sheaves 18 for guiding cable C through opening 15. Extending from the trailing face of mounting block is a leading gripper assembly generally indicated at 20. Gripper assembly 20 is suitably secured to mounting block 16 and sled 12 by means not shown as to remain fixed relative to the sled and mounting block.

A pair of fluid actuated ram assemblies 22 are carried by sled 12 on opposite sides of leading gripper assembly 20. Specifictlly, the forward ends of cylinders 24 are suitably secured to mounting block 16 with the outer ends of pistons 26 being suitably secured to the opposite ends of a cross bar 28. Cross bar 28 has a central bore 29 for receiving the cable C issuing from a following or trailing gripper assembly generally indicated at 30. Gripper assembly 30 is constructed similarly as gripper assembly 20 and is suitably secured by means not shown, to the foward face of cross brace 28. Cross brace 28 and gripper assembly 30 are carried in suitable guides, not shown, on sled 12 for longitudinal reciprocating movement along sled 12 in response to alternate extension and retraction of pistons 26.

Also carried by sled 12 are a plurality of elongated cylindrical flotation tanks 32. As seen in FIGS. 2 and 4, tanks 32 are spaced transversely one from the other above sled 12 by suitable supports indicated at 34. Three tanks 32 are preferably employed and the intermediate tank is suspended between the side tanks 32 by suitable cross bracing 36. Tanks 32 comprise flotation chambers which may be filled with air or from to provide a displacement sufficient to afford the pipe laying apparatus 10 slight negative buoyance. In this fashion, the ground bearing pressure of sled 12 and the component parts carried thereby on the sea bottom is minimized. This affords significant reductions in the resistance to movement along the sea bottom L or trench Tr in a manner hereinafter amplified.

Trailing behind the pipe pulling appaartus 10, is a smaller sled 40 carrying mounting blocks 42 on which rests the forward or seaward end of the initial pipe section 43. Suitable means, not shown, are provided for releasably securing pipe section 43 to sled 40. Sled 40 carries on suitable flotation tank 44 as by upstanding braces 45 whereby the effective ground pressure of the seaward end of the initial pipe section 43 and sled 40 is minimized. Also, the tendency for the end of this pipeline to rotate is resisted by the moment induced by the buoyancy of the flotation tank and its lever arm provided by the upstanding braces. This is significant as usually a twisted cable C is employed which, when under tension, tends to rotate the pulling assembly. This tendency is overcome by the moment acting on the assembly, provided by the flotation or stabilizing tank 44 should the pulling assembly be inclined or canted about its longitudinal axis. Of course this counterbalancing moment provided by the flotation or stabilizing tanks is effective to maintain the assembly in an operative upright position should it tend to incline or cant as a result of forces action on it other than the cable twist. A suitable pipe pulling head 46 is secured to the seaward end of initial pipe setcion 43 in a manner such that the seaward end is sealed from ingress of water. Particularly, the heads 46 terminates at its aft end in a flange 47 for bolting with the flanged end of the initial pipe section 43. The forward end of pipe pulling head 46 and cross brace 28 on pipe pulling sled 12 each carry a pair of mounting lugs 48. A link 50 is pivotally connected between lugs 48. In this manner, pipe pulling assembly 10 is articulately linked to the forward end of pipeline P and it will be appreciated that, as sled 12 advances along cable C, sled 40 is drawn behind it.

Referring now to FIGS 3 and 6, each of the gripper assemblies 20 and 30 comprises an elongated housing 60 having a pair of elongated fixed shoes 62 and 64 and an elongated movable shoe 66 disposed between fixed shoes 62 and 64. Longitudinally along one face of movable shoe 66, there is provided a recess 68 for receiving an elongated flexible tube-like bag 70. Bag 70 has an inlet for connection with a fluid line whereby fluid can be selectively supplied and exhausted to bag 70 thereby to selectively expand and contract bag 70. Along the opposite face of movable shoe 66, there is provided an elongated V-shaped groove in registry with an elongated V-shaped groove 74 provided along the face of fixed shoes 64. Opposite ends of housing 60 are provided with suitable openings for receiving cable C which is disposed between fixed shoe 64 and moveable shoe 66 within the V-shaped grooves 72 and 74. It will be appreciated that by moving shoe 66 toward and away from shoe 64, shoes 64 and 66 cooperate to respectively clamp about and release cable C with the result that the gripper assemblies 20 and 30 can each alternately grip and release cable C. Springs, not shown, may be provided to bias movable shoe 66 away from shoe 64 whereby the grippers normally lie in a cable released position.

A fluid control circuit is provided grippers 20 and 30 and fluid actuated rams 22, the circuit being schematically illustrated in FIG. 8. Particularly, a four way, three position valve 76 is carried on the pipe pulling assembly 10 and lies in communication with a pump 78 and a reservoir 80 via fluid conduits 82 and 84 respectively. It will be appreciated that conduits 82 and 84 comprise flexible lines connecting between the vessel V and pipe laying apparatus 10 as seen in FIG. 1 with the pump 78, reservoir 80 and other associated equipment illustrated within the dashed lines in FIG. 7 being carried by vessel V. A pair of fluid lines 86 and 88 also connect with valve 76 and alternately supply pressure fluid to cylinders 24 to extend and retract pistons 26. Fluid line 86 also supplies and exhausts fluid from the bag 70 associated with the rear gripper 30 via a fluid line 90. A fluid line 92 also connects between line 88 and the bag 70 associated with the leading gripper assembly 20 for supplying and exhausting pressure fluid therefrom. Valve 76 is normally spring biased to a central position by springs associated with sequencing valves 92 and 94. Valves 92 and 94 are connected to supply lines 86 and 88 via fluid lines 96 and 98 respectively and are actuated in response to a fluid pressure in lines 86 and 88 above a predetermined pressure to shift valve 76. For example, with valve 76 shifted to the right as seen in FIG. 8, pressure fluid is supplied by pump 78 via fluid lines 82, 86 to cylinders 24 to extend pistons 26. Pressure fluid is also provided via conduits 86 and 90 to the flexible bag 70 associated with rear gripper 30. The opposite sides of pistons 26 and the flexible bag 70 associated with the leading gripper 20 lie, with valve 76 shifted to the right, lie in communication with reservoir 80 via conduits 88 and 84, the latter acting as exhaust conduits. In this fashion, pressure fluid supplied to cylinders 14 extends pistons 26 while the rear gripper 30 simultaneously clamps about cable C. At the end of the stroke, the pressure in supply lines 86, 82, 90 and 96 builds up above a predetermined pressure whereupon sequence valve 92 is actuated to shift valve 76 to the left as seen in FIG. 8. With valve 76 shifted to the left pressure fluid is exhausted from cylinders 24 and the bag 70 associated with following gripper 30 to reservoir 80 via return lines 86, 90 and 84. Pressure is also relieved at sequencing valve 92 whereupon it returns to its normal position. With valve 76 shifted to the left, pressure fluid is supplied by pump 78 and via fluid lines 88 and 82 to the opposite sides of pistons 26 to retract the latter. Fluid pressure is simultaneously provided the bag 70 associated with the leading gripper 20 via conduit 92. In this fashion, pistons 26 are simultaneously retracted while simultaneously the leading gripper 20 grips about cable C. At the end of this return stroke, the pressure fluid in supply line 88 builds up above the predetermined pressure, whereupon sequencing valve 94 is actuated to shift valve 76 to the right as seen in FIG. 8. When this occurs, the pressure fluid exhausts from the bag 70 carried by the forward gripper 20 to thereby release cable C and also exhausts from the opposite sides of piston 26 to reservoir 80. With valve 76 shifted to the right, pressure fluid is again supplied to the cylinders 24 and the bag associated with trailing gripper 30. This fluid actuated cycle is continuously repeated for so long as pressure fluid is supplied to the system by pump 78.

Referring now to FIG. 7, there is schematically illustrated the movement of pipe pulling apparatus 10 along cable C. As will be recalled, leading gripper assembly 20 is rigidly secured to sled 12 while gripper assembly 30 is secured to cross brace 28, gripper assembly 30 and cross brace 28 being mounted for reciprocation longitudinally along sled 12 by the extension and retraction of pistons 26. In FIG. 7A, trailing gripper assembly 30 lies in a retracted position along sled 12. To advance sled 12 along the sea bottom and along cable C, valve 76 is shifted to the right in FIG. 8 by means not shown to provide pressure fluid via conduits 82, 86 and 90 to the bag 70 associated with trailing gripper assembly 30 whereby the bag extends to displace movable shoe 66 toward shoe 64 thereby to clamp about cable C. The bag 70 associated with leading gripper assembly 20 is exhausted of pressure fluid via conduits 92, 88 and 84. Gripper assembly 20 is accordingly slideable relative to cable C. Cable C is directed to one side of the pipeline by a pair of sheaves indicated at 100 on the aft end of sled 12.

Referring now to FIG. 7B, the pressure fluid supplied to gripper assembly 30 is also supplied to cylinders 24 to extend pistons 26. With gripper 30 clamped about cable C, the reaction force on cylinders 24 advances sled 12 along the sea bottom and along cable C relative to gripper 30. At the end of the stroke, the pressure fluid in supply line 86 causes sequence valve 92 to shift valve 76 to the left as seen in FIG. 8 whereupon the pressure fluid associated with trailing gripper 30 is exhausted via conduits 90, 86 and 84. Simultaneously, pressure fluid is supplied to the bag 70 associated with leading gripper 20 whereby gripper 20 clamps about cable C. In this manner, the trailing gripper assembly 30 is released from and slideable relative to cable C and the leading gripper clamps about cable C. Simultaneously with the shifting of valve 76 to the left, pressure fluid is also supplied to cylinders 24 via conduits 82 and 88 to retract pistons 26. Retraction of pistons 26 draws the rear gripper assembly 30 forwardly along cable C and along sled 12 to the position illustrated in FIG. 8. When fully retracted as illustrated in FIG. 6A, sequence valve 94 is actuated to shift valve 76 to the right as seen in FIG. 8 whereupon pressure fluid is exhausted from cylinders 24, and the bag 70 associated with the leading gripper 20 via conduits 88 and 84 and is supplied to cylinders 24 on the opposite sides of pistons 26 and to the bag 70 associated with the trailing gripper 30 whereby the sled 12 is again advanced as previously described.

In this fashion, the pipe pulling assembly walks or steps along cable C from the onshore terminal F to the offshore terminal T pulling the sealed pipe sections forming the pipeline behind. When the pipeline is in place, the sleds and cable grippers can be removed from the end of the pipeline, for example by a diver, and the pipeline can be filled with water via a flooding valve 99 carried on head 46 to prevent the pipe from floating up. The head 46 can then be subsequently removed as by a diver and suitable connection can then be made to the offshore terminal. Moreover, if the pulling line or cable is shorter than the full run of pipeline, the grippers would then be released and the pulling line would be pulled down toward the offshore terminal and reanchored. The pulling assembly can then be reattached to the pulling line and again actuated to draw the pipeline toward the reanchored end of the pulling line.

It will be appreciated that the length of the pipeline layed without changing anchors is limited only by the size and length of the cable selected. Furthermore, the device may be employed to pull the trenching equipment utilized to form the trench Tr and then again used to pull the pipeline along the prepared trench. Moreover, the apparatus hereof may also be employed to lay electric cable, water lines, sewer lines, liquid natural gas and the like as desired.

What is claimed and desired to be secured by United States Letters Patent is:

1. A method of laying pipeline along a predetermined underwater path by drawing the pipeline along said path by a pipe pulling assembly disposed adjacent the land water interface including the steps of; laying a guide line along said predetermined path fixing, one end of the guide line adjacent one end of the path, coupling the pipe pulling assembly to the guide line adjacent the other end of the path, coupling an end portion of the pipeline to the pipe pulling assembly, and providing traction between said pipe pulling assembly and said guide line to advance the pipe pulling assembly along the guide line thereby to draw the pipeline along the path.

2. A method according to claim 1 including the step of alternately advancing the pipe pulling assembly and pipeline along the guide line.

3. A method according to claim 1 wherein the pipe pulling assembly includes a pair of gripper assemblies operable to alternately grip the guide line and means connecting the gripper assemblies for alternately spacing one gripper assembly away from the other gripper assembly and advancing the other gripper assembly toward the one gripper assembly, one of the gripper assemblies being coupled to the pipeline, including the step of gripping the guide line with the one gripper assembly and advancing the other gripper assembly toward the one gripper assembly.

4. The method according to claim 3 including the step of releasing the grip on the guide line by the one gripper assembly, gripping the guide line by the other gripper assembly and advancing said one gripper assembly along the guide line away from the other gripper assembly.

5. The method according to claim 1 including the step of closing the end portion of the pipeline to provide buoyancy thereto.

6. A method of laying pipe line along a predetermined underwater path by drawing the pipeline along said path by a pipe pulling assembly disposed adjacent the land water interface comprising the steps of: providing an underwater guide line along the predetermined path; coupling the pipe pulling assembly to said guide; coupling an end portion of the pipeline to the pipe pulling assembly; and providing traction between said pipe pulling assembly and said guide line to advance the pipe pulling assembly along the guide line thereby to draw the pipeline along the path.

7. Apparatus for laying pipe along the land bottom underlying a body of water and along a predetermined path defined by an underwater guide line fixed at one end comprising a sled, a gripper assembly carried by said sled and including a pair of spaced grippers for gripping the guide line, means connecting the grippers one to the other and operable to alternately advance one gripper away from the other gripper along the guide line and advance the other gripper toward the one gripper along the guide line, said connecting means including a pair of fluid actuated pistons and cylinders with the pistons being coupled to one of the grippers and the cylinders being coupled to the other of the grippers, means carried by one of the grippers for securing an initial portion of the pipe thereto, means for selectively actuating said grippers and said advancing means to alternately grip the guide line and alternately advance said grippers respectively such that said other gripper grips the guide line when said one gripper is advanced and said one gripper grips the guide line when said other gripper is advanced thereby to draw the pipe along the path.

8. Apparatus according to claim 7 including a support on the side of said moveable shoe away from said other shoe, a flexible bag disposed between said movable shoe and said support, said actuating means including a source of pressure fluid and a fluid conduit connecting between said source and said bag for communicating pressure fluid to said bag expand the latter and move said one shoe toward the other shoe.

9. Apparatus for laying pipe along the land bottom underlying a body of water and along a predetermined path defined by a underwater guide line fixed at one end comprising a sled, a gripper assembly carried by said sled and including a pair of spaced grippers for gripping the guide line, each of said grippers including a pair of spaced shoes for receiving the guide line therebetween, at least one of said shoes being movable toward and away from the other shoe, said actuating means being operable to move said one shoe toward the other shoe to grip the guide line, means connecting the grippers one to the other and operable to alternately advance one gripper away from the other gripper along the guide line and advance the other gripper toward the one gripper along the guide line, means carried by one of the grippers for securing an initial portion of the pipe thereto, means for selectively actuating said grippers and said advancing means to alternately grip the guide line and alternately advance said grippers respectively such that said other gripper grips the guide line when said one gripper is advanced and said one gripper grips the guide line when said other gripper is advanced thereby to draw the pipe along the path.

10. Apparatus for laying pipe along the land bottom underlying a body of water and along a predetermined path defined by an underwater guide line fixed at one end comprising a sled, flotation tanks carried by said sled, a gripper assembly carried by said sled and including a pair of spaced grippers for gripping the guide line, means connecting the grippers one to the other and operable to alternately advance one gripper away from the other gripper along the guide line and advance the other gripper toward the one gripper along the guide line, means carried by one of the grippers for securing an initial portion of the pipe thereto, means for selectively actuating said grippers and said advancing means to alternately grip the guide line and alternately advance said grippers respectively such that said other gripper grips the guide line when said one gripper is advanced and said one gripper grips the guide line when said other gripper is advanced thereby to draw the pipe along the path.

11. Apparatus for laying pipe along the land bottom underlying a body of water and along a predetermined path defined by an underwater guide line fixed at one end comprising a sled, a gripper assembly carried by said sled and including a pair of spaced grippers for gripping the guide line, means connecting the grippers one to the other and operable to alternately advance one gripper away from the other gripper along the guide line and advance the other gripper toward the one gripper along the guide line, means carried by one of the grippers for securing an initial portion of the pipe thereto, means for selectively actuating said grippers and said advancing means to alternately grip the guide line and alternately advance said grippers respectively such that said other gripper grips the guide line when said one gripper is advanced and said one gripper grips the guide line when said other gripper is advanced thereby to draw the pipe along the path, a second sled coupled to said first sled, means on said second sled for mounting the initial portion of the pipe.

12. Apparatus according to claim 11 including flotation tanks carried by each of said sleds, and having a center of buoyancy above the center of gravity of said pipelaying apparatus.

References Cited

UNITED STATES PATENTS

| 2,219,515 | 10/1940 | Doberstein | 254—106 X |
| 3,431,740 | 3/1969 | Lamy | 61—72.4 |

FOREIGN PATENTS

| 949,420 | 1964 | Great Britain | 254—105 |

JACOB SHAPIRO, Primary Examiner

U.S. Cl. X.R.

254—105

UNITED STATES PATENT OFFICE
CERTIFICATE OF CORRECTION

Patent No. 3,616,651          Dated November 2, 1971

Inventor(s) N. MING CHANG et al

It is certified that error appears in the above-identified patent and that said Letters Patent are hereby corrected as shown below:

The name of one of the inventors, appearing as "MING N. CHANG" in Column 1, and on two sheets of drawings, should read --N. MING CHANG--.

Col. 1, line 38, "offshore" should read --onshore--; lines 55-56, "subsequnt" should read --subsequent--.

Col. 2, line 1, "of" should read --or--; line 10, "or" second occurrence should read --of--; line 21, "or" first occurrence should read --of--.

Col. 4, line 41, "block" should read --block 16--; line 47, "Specifictlly" should read --Specifically--; line 68, "from" should read --foam--.

Col. 5, line 23, "setcion" should read --section--.

Col. 6, line 17, "14" should read --24--; line 57, "extends" should read --expands--.

Col. 7, line 50, Claim 1, "path fixing," should read --path, fixing--.

Col. 8, line 47, Claim 9, "a" should read --an--.

Signed and sealed this 27th day of June 1972.

(SEAL)
Attest:

EDWARD M. FLETCHER, JR.          ROBERT GOTTSCHALK
Attesting Officer          Commissioner of Patents